US005559894A

United States Patent [19]

Lubliner et al.

[11] Patent Number: 5,559,894
[45] Date of Patent: Sep. 24, 1996

[54] AUTOMATED METER INSPECTION AND READING

[76] Inventors: David J. Lubliner, 143 Howell Ave., Fords, N.J. 08863; Jaskaran Dhaliwal, 10 Challenger Ct., North Plainfield, N.J. 07060; John Gidney, 45 Glenwood Dr., North Bergenfield, N.J. 07621; Gerald E. Gore, 1005 Highway 28, North Branch, N.J. 08876; Jack J. Greenfeder, 9 Deepdale Dr., Randolph, N.J. 07869; Joshua Greenfeld, 54 Leslie St., Edison, N.J. 08817; Melvin C. Hinton, 147 Fulton Ave., New Brunswick, N.J. 08901; William McHugh, 6 Walden La., Denville, N.J. 07834; Anthony Parsio, 461 Hickory Ave., Kearney Pt., N.J. 07481; Ian Rintel, 57 Ottawa Rd., South Marlboro, N.J. 07746; Harry T. Roman, 25 Laurel Ave., East Orange, N.J. 07017; Jake Vogelaar, 729 Willow Run, Wyckoff, N.J. 07481

[21] Appl. No.: 84,458

[22] Filed: Jun. 28, 1993

[51] Int. Cl.⁶ .................................................. G06K 9/00
[52] U.S. Cl. .......................... 382/100; 382/203; 324/110
[58] Field of Search ................................ 382/1, 25, 30; 358/107; 340/932; 324/110

[56] References Cited

U.S. PATENT DOCUMENTS

| | | | |
|---|---|---|---|
| 4,305,130 | 12/1981 | Kelley et al. | 364/513 |
| 4,415,853 | 11/1983 | Fisher | 324/74 |
| 4,680,704 | 7/1987 | Konicek et al. | 382/1 |
| 5,056,107 | 10/1991 | Johnson et al. | 324/110 |
| 5,086,292 | 2/1992 | Johnson et al. | 324/110 |
| 5,113,130 | 5/1992 | Balch | 324/110 |

Primary Examiner—Leo Boudreau
Assistant Examiner—Christopher S. Kelley
Attorney, Agent, or Firm—Klauber & Jackson

[57] ABSTRACT

A method and device, including a portable embodiment, for the automated inspection of devices having different visual changeable and non-changeable indicia on the faces thereof. Specific devices include meters, particularly electric usage meters, for detection of tampering, for improving efficiency of maintenance procedures and for usage in reading the meters for billing purposes. Meters of various heights, configuration and construction are fixed into designated positions and are inspected by visual computer-linked camera scanning, to determine meter periphery and a location reference point, and imaging of identifying portions of meter faces relative to the determined location reference point. The identifying portions are compared with correlative templates of existing meter types, stored in computer memory. Identification of specific meter type permits exact location and subsequent OCR identification of the specific meter number (with use history) and parameters (voltage, amperage, wire connections etc.) for preparation of an operability-inspection station. Meter dial needle positions are read by light scanning of respective determined dial positions, and imaging of connected dark pixels, indicating needle location. A slope determination fixes the reading of the dial, which is used for billing purposes. Adjacent dial needles are in a predetermined relative position with deviations therefrom indicating tampering. Numeral meter readings are OCR scanned for billing purposes.

17 Claims, 16 Drawing Sheets

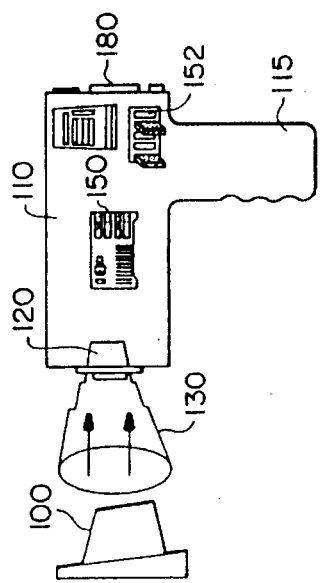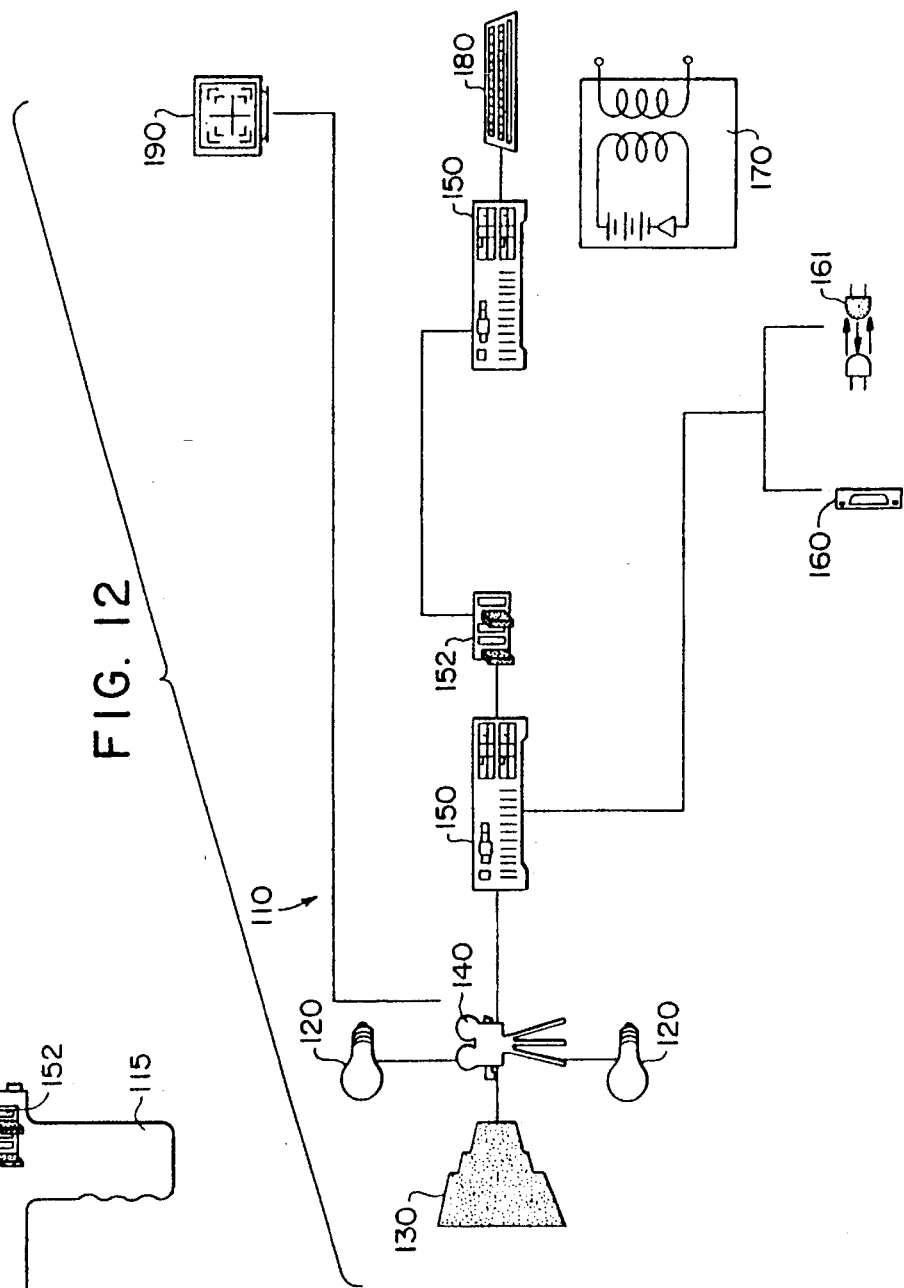

AUTOMATED METER INSPECTION AND READING

FIELD OF THE INVENTION

The present invention relates to automated reading of selected portions of visual indicia on the faces of different devices. The invention particularly relates to the large scale automated reading and inspection of meters, particularly electric meters, with respect to quality control maintenance inspection of the meters; and automated on-site and off-site actual meter readings for usage and billing determinations; as well as determination of whether the meters have been tampered with.

BACKGROUND OF THE INVENTION

At present, meters are individually manually inspected to determine if they have been tampered with. If a determination is made that a meter has been tampered with, the meter is separately stored and an investigation is made of the user.

In addition, test fixtures, for checking operability of meters, must be individually specifically and manually set for the testing parameters of each type of meter. These parameters appear on the face of the meters. Defective meters are removed from use and properly operating meters are returned to use. If desired, meters which are inoperative because of calibration defects and the like, can be re-calibrated or otherwise refurbished for use. In all instances, a last reading of the meter is required for billing purposes (either direct usage or with compensation for the defect or calibration deviation if possible).

Large scale automation of meter inspection, meter reading, both on and off-site, and meter handling has been precluded, to date, as a result of the multitude of different meters from many manufacturers and the numerous types of meters from the same manufacturer.

BRIEF DESCRIPTION OF THE INVENTION

The present invention comprises a method and device for automated obtaining of information from devices having exposed faces, with fixed and changeable visual indicia of information thereon. The fixed visual indicia provides information unique to the device such as type identification and various parameters of the device. The changeable visual indicia generally comprises information regarding ongoing functions, e.g., a meter reading. The devices, of different types, have different face configurations and information thereon. In accordance with the present invention, the devices are fixedly positioned in a pre-set position with such pre-set position including the operative position of the devices, such as meters in their sockets. The method comprises the steps of:

a. illuminating an exposed face of a device with diffused light or any light which is uniform and not susceptible to shadowing;

b. determining a location reference point on the face of the meter; such determination either being effected mechanically or more preferably by the steps of:

i) recording or scanning an image of said illuminated exposed face and the area peripheral thereto;

ii) visually scanning the recorded or scanned image, of the illuminated exposed face and the area peripheral thereto, by visual scanning means, with computer feedback means, whereby the periphery of the illuminated exposed face is determined; and iii) determining the location reference point on the illuminated face relative to said periphery with said computer feedback means;

c. fitting areas of the face of the device, relative to the location reference point, with computer-stored visual template means, having individual templates unique to each of the devices, until a template correlates with a pre-located position on the face of the device; with the particular face and device being thereby identified; and d. visually scanning the image of the illuminated identified face for the visual indicia thereon, by light-dark or optical character recognition means, with location instructions by the computer feedback means, with reference to computer stored parameters of the device and the face thereof.

A device for effecting the automated obtaining of information from devices, having visual indicia on the faces thereof, comprises the means for fixedly positioning the devices in position during visual scanning when the devices are removed from their normal fixed operational position; computer-linked visual scanning means; mechanical or computer feedback means, for determination of the location reference point on the faces of the devices; computer-stored device-identifying template means; and visual recognition means for recognition of light and dark areas and optical characters. With devices having visual indicia in the form of one or more dial indicators with needle indicators, the device further comprises means for reading the needle positions, such as a reading of a meter and with means for determining relative position of the needles, as an indication of device and particularly meter tampering.

A portable device embodiment allows the devices, such as meters, to remain fixed in their fixed operational positions, during the visual scanning. This is of particular utility for meter reading and meter tampering checking, with elimination of transport time and expense.

It is an object of the present invention to provide an automated method and device for the obtaining of information from the faces of devices having different indicia therein and, in particular, the obtaining of such information for inspection processing of devices and particularly meters of varying types, particularly electric meters, for determination of proper operability, actual meter reading, and for tampering determinations.

It is a further object of the present invention to utilize visual recognition with computer stored templates to process, on an automated basis, meters of varying, manufacture, types, heights, and configurations on a single processing and inspection line.

It is a still further object of the present invention to provide a fully automated system for inspecting, separating and handling meters which have been determined to have been tampered with, operable meters, and inoperable meters.

It is yet another object of the present invention to provide a transportable or hand held portable means for on-site automated reading of meters and/or tampering determinations.

These and other objects, features and advantages of the present invention will become more evident from the following discussion and drawings in which:

BRIEF DESCRIPTION OF THE DRAWINGS

FIG. 11 is a schematic representation of a portable device utilizing the template meter identification and visual scanning of the present invention, to read meter faces, on-site, for billing and tampering determinations or for the video image retention of the meter face for subsequent reading at a remote location;

FIG. 12 is a functional blow-up depiction of the components of the portable device shown in FIG. 11;

DETAILED DESCRIPTION OF THE INVENTION

Figure 1:
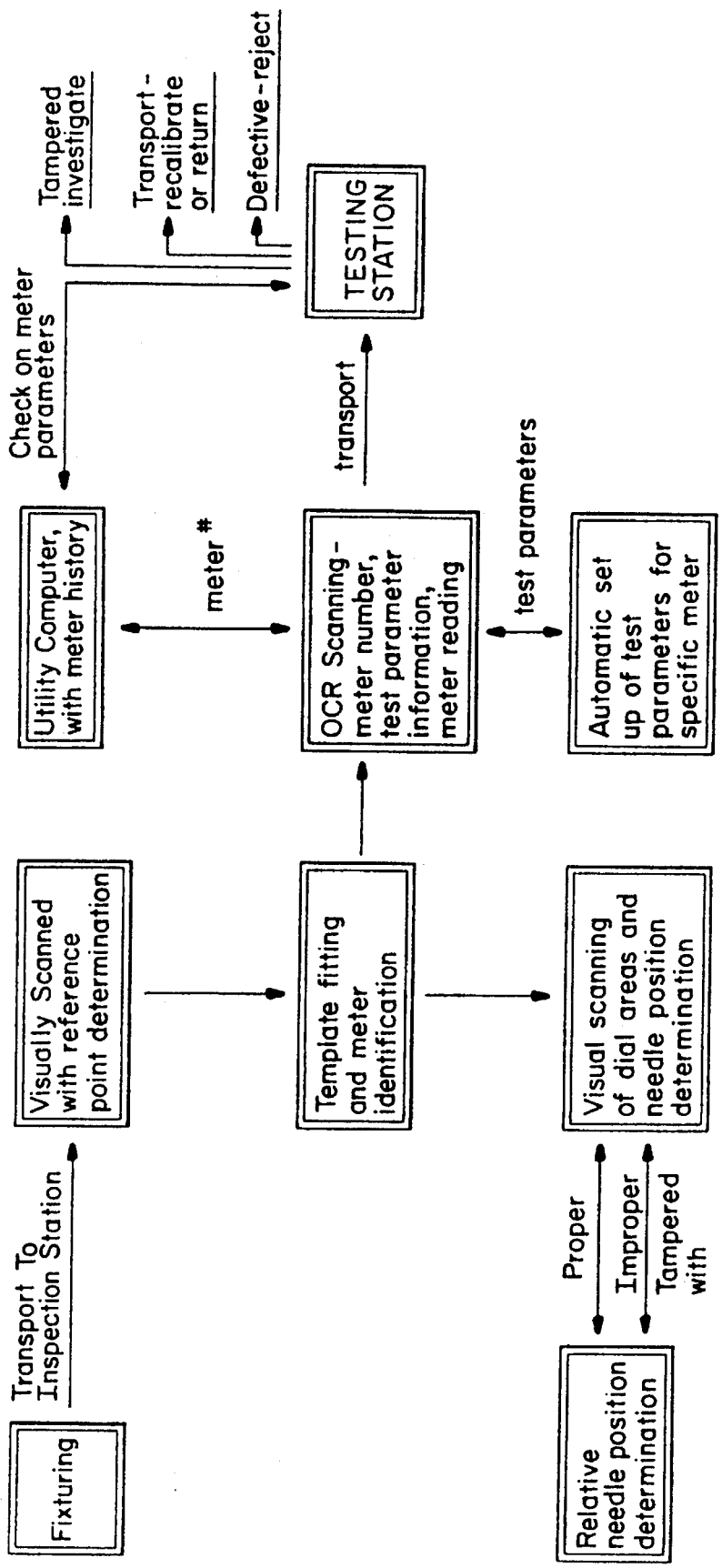
FIG. 1 is a processing flow chart of an embodiment of the method of the present invention.

Generally the present invention comprises a method and the device used for the automated reading of the faces of devices of different configuration, with the devices having changeable and non-changeable visual indicia on the faces thereof. The invention is particularly directed to the automated reading and inspection of meters, particularly electric usage meters, for any or all of the purposes of determination of usage (in the form of dial or display reading for appropriate billing), proper meter operability and for tampering detection. In accordance with the method of the present invention, the meters are each:

1. fixtured into fixturing means into a relatively immovable position, relative to the fixturing means, with the face of the meter being exposed for subsequent visual scanning; with on-site meters already being appropriately fixtured by their initial placement in the meter socket;

2. transported, by movement of the fixturing means, to a visual inspection station, with the exposed face of the meter being exposed to computer-linked visual scanning means; with transport being unnecessary if the meters are fixtured at the visual inspection station or they are fixtured on-site in their use sockets;

3. visually scanned at a visual inspection station, by the visual scanning means, with computer feedback means, for determination of a location reference point on the face of the meter; alternatively mechanical means are utilized to determine the location reference point;

4. fitted, relative to the location reference point, with computer-stored meter-identifying template means until a meter-identifying template means correlates with a pre-located position of the meter face; the particular type of meter face and meter being thereby identified and the orientation of the meter within the fixturing means, if necessary, also being determined;

5. visually scanned, by optical character recognition means, with location instructions by the computer feedback means, with reference to the computer stored identified meter face parameters; at positions of the meter face, having the meter identifying number and characteristics, which determine maintenance testing parameters; imprinted or displayed thereon in predetermined positions;

6. visually scanned for needle positions of the dials, with location instructions from the computer feedback means, with reference to the computer stored identified meter face parameters; the relative position of the needles being thereafter used as a reading of the meter, indication of meter operability and meter tampering; or, alternatively, with digital meters, visually scanned for direct reading of the digital meter read-out;

7. subsequently maintenance tested by testing means, having been pre-set in accordance with the scanned characteristics or characteristics determined from computer storage memory correlating to the scanned meter identifying number; and 8. separated into transport lines of tampered meters requiring investigation; inoperable meters for disposal; and operable meters for refurbishment (if necessary) and return to use.

It is understood that the meters need not all be investigated for tampering or proper operation or read for billing purposes and accordingly the meters do not necessarily undergo all of the aforementioned steps. Instead, as required, the individual meters may be tested, inspected, investigated or read, for any or all of such purposes, once visual identification of the specific meter has been effected.

An embodiment of the device of the present invention comprises the combination of fixturing means; transport means; the computer-linked visual scanning means, e.g., video cameras; the computer feedback means, for determination of a location reference point on the face of the meter; the computer-stored meter-identifying template means and the visual character recognition means. In addition, the device may further include validation of field meter reading means; the determination of meter tampering means, as well as automated meter handling means for testing; the results of the testing means including but not limited to the meter reading, meter accuracy and data acquisition and subsequent processing.

In a portable embodiment of the present invention, designed for field use, with already fixtured meters, the device does not include the fixturing or initial transport means nor is there any testing and transport line. With such embodiment, automated meter reading is possible with optional tampering determination. In addition, if the portable embodiment is properly fitted to the individual meters, the location reference point, may be mechanically determined by the fitting itself rather than with the visual scanning and computer feedback.

An intermediate portable device retains properly illuminated video images of the meter faces for subsequent reading and analysis at a remote location having the device of the present invention. With both types of portable devices, transmission, for example, may be by cellular phone (e.g., via RS 232 connection and a modem), radio waves, or by infrared transmission. Such transmission can serve to provide immediate meter reading information to a central processing point for immediate processing and billing.

In a preferred embodiment of the present invention, meters of various heights, configuration and construction are brought and fixtured into designated positions by placement into standard meter receptacles on a transportable base. Electric socket type meters are, for example, fixed into position by placement in standard socket meter receptacles. The meters are then transported by movement of the transportable base and locked into direct vertical alignment with computer-linked video cameras for the visual scanning of the faces thereof. With the vertical alignment, reflections from the glass faces of the meters do not significantly affect scanning and such glass faces need not be removed, though removal of the glass faces is not precluded, if desired, for prevention of possible breakage during handling.

To further enhance the integrity of the visual scanning, diffused or non-shadowing lighting means is used to illuminate the meter faces without shadows. Means for diffusing light is positioned in the light path between the light source and the meters with either direct or indirect (bounced) lighting. The cameras are preferably of an automatic focussing type, to adjust for image sharpness of meters of varying heights.

Generally, meter height, among the various types and configurations, varies by about 3 inches (7.6 cm) and a focussed point at the midpoint of such variation ensures the requisite sharpness of imaging.

Though all standard meters are substantially circular, because of variations in size, heights and face configuration, it is necessary to fix a reference point in any particular meter for correlation to known informational portions of the particular meter. In accordance with a preferred embodiment of the present invention, it is desirable that the center of the meter face be located for such use as a reference point.

In order to fix the location of the center point, the general area of the fixtured meter is visually scanned for light and dark pixel areas in diagonally crossing directions, which intersect the meter face. The base on which the meter is fixtured and which surrounds the meter image is light and the diagonals proceed until dark pixels (surrounded by dark pixels-to eliminate single dark noise spots such as caused by dirt specks) are encountered. These dark pixels comprise the outer edge of the meter face and define points on the circumference of the meter face. Three points are required to define the circle and the fourth point acts as a check. With the definition of the circumference of the meter face, the center point is readily determined. Similar algorithms may be utilized to determine square, rectangular, octangular or other regular geometric perimeters of devices to be read and wherein a reference point therein has been pre-established.

The computer, linked with the video cameras, has contained in its memory storage unit, parameters of identifying templates which are individually unique to the different meters being used in the field. For example, a template can consist of lettering at a specific position of the meter face. This specific position is correlated to the center point.

It is understood that the template can comprise the entire meter face. However, this is at a cost of operating speed and is limited by working memory of the computer. It is presently accordingly preferred that the templates define small areas suitable for use in meter identification whereby currently available personal computers can be effectively utilized. The identifying template areas may be of reverse video, i.e., white on black rather than black on white to accommodate meters having such reverse video faces.

The computer compares successive templates with the video images until a match occurs. It is noted that with electric meters, the standard socket receptacle, in which meters are fixtured during actual use, can accommodate the electric meter in one of two positions, which are 180° apart. Accordingly, each template comparison is effected at two locations, 180° apart. Templates for meters and devices should, in general, be pre-established for all the possible fixturing positions.

With correlation of template and meter face, the particular meter is identified and its orientation in the fixture is determined (as will be required for subsequent physical handling). Location parameters for information contained on the particular meter face, are contained in the memory storage unit of the computer and is used to direct an OCR means (e.g., a separate device, or more preferably, the camera visual scanner linked to the computer with programmed OCR software) to read such information which includes meter identification number, manufacturer, manufacturer model or type, voltage, amperage, number of wires, meter reading, etc.

Readings of digital face meters requires that the normal LED face be electrically activated for such reading. Accordingly, for such meters it is preferred that the fixturing element be provided with a power supply (e.g., a battery with transformer or a direct power line), which electrically engages the meter socket with sufficient power to activate the display, on at least a transient basis during the time of the reading.

With meters which are to be operationally tested, the information is transmitted to a testing unit for automated set-up when the meter is subsequently connected to the testing unit for maintenance inspection. At the same time, the meter number and meter reading is also preferably transmitted to the utility computer (e.g., electric company) for verification of specific meter history and testing parameters.

With meters having dial indicators in the forms of rotating needles, the dial areas of the meter are visually scanned for successive dark pixels (light pixels in the case of reverse video images) which represent the respective needle indicators of the respective dials. A slope determination of the successive dark pixels is correlated to provide the dial reading and meter reading. Adjacent dials of any meter are interrelated by known constants and deviations therefrom serve as a positive indication of meter tampering.

With meters requiring operational testing, all meters, including tamper identified meters (with the tampering determination) are transported to the testing station.

At the testing station the meters are removed from the fixturing and transport device, preferably robotically, and are inserted, with predetermined orientation into the testing devices which have been respectively preset with testing parameters for the specific meter. Traffic control means, in the form of stored data determines the length of time required for the testing of the specific meter for efficient allocation of testing device sites.

After testing, the meters are removed, again preferably robotically, and sorted onto one of three lines. One line collects meters which have been determined to have been tampered with and an investigation is called for with respect to the historically identified user (from the utility company computer correlated to the meter number). Another line collects inoperable or defective meters for disposal and the third line collects meters for either refurbishment or direct restoration to use.

Though the above description relates specifically to electric meters, the method and device of the present invention are similarly applicable and useful in the automated reading and/or testing of other types of meters and circular devices (as well as other established shapes) including gas and water meters, requiring visual identification and visual reading of indicia on the faces thereof.

Though the above method has been defined as being fully automated, the major labor intensive steps involve tampering determinations and presetting of the testing units. It is accordingly possible to utilize both manual and automated operations in effectively utilizing the method of the present invention. Thus, for example, the fixturing and transport of meters can be done manually without significant loss of through-put time. With such criteria, with the portable device embodiment, testing may be done proximate to the operational meter site, by means of a transportable (e.g., in a van) testing station to which the portable device is linked. Transport to a remote testing site and return, is minimized, with reduction of both meter down-time and transport expense.

Since scanning is preferably effected with computer linked video cameras, it is possible to separate the scanning from the computer, by recording video images of the respective meters. In this embodiment the video images are either identified or visually scanned at a later convenient time. The video images can also be retained and utilized, where appropriate, as evidence of meter tampering. This embodiment has particular applicability to on-site meter inspection with subsequent evaluation by remote installations.

DETAILED DESCRIPTION OF THE DRAWINGS AND THE PREFERRED EMBODIMENT

With specific reference to the drawings, FIG. 1 depicts the sequential process of inspection of the meters in accordance with the present invention; from fixturing and transport, if required; to visual scanning for determination of a reference point; utilization of the reference to visually computer fit the meter face with identifying templates until the meter is identified; then separate OCR scanning for meter information to prime a testing station for subsequent testing and visual scanning of dial needle positions for determination of the meter reading and whether tampering has occurred; then transport to a testing site for physical testing of meter operation and subsequent physical line separation into tampered, discard and re-use lines. As part of the system, the utility company computer is optionally accessed with the specific meter number as a cross check to the visual determination of parameters.

Figure 2:
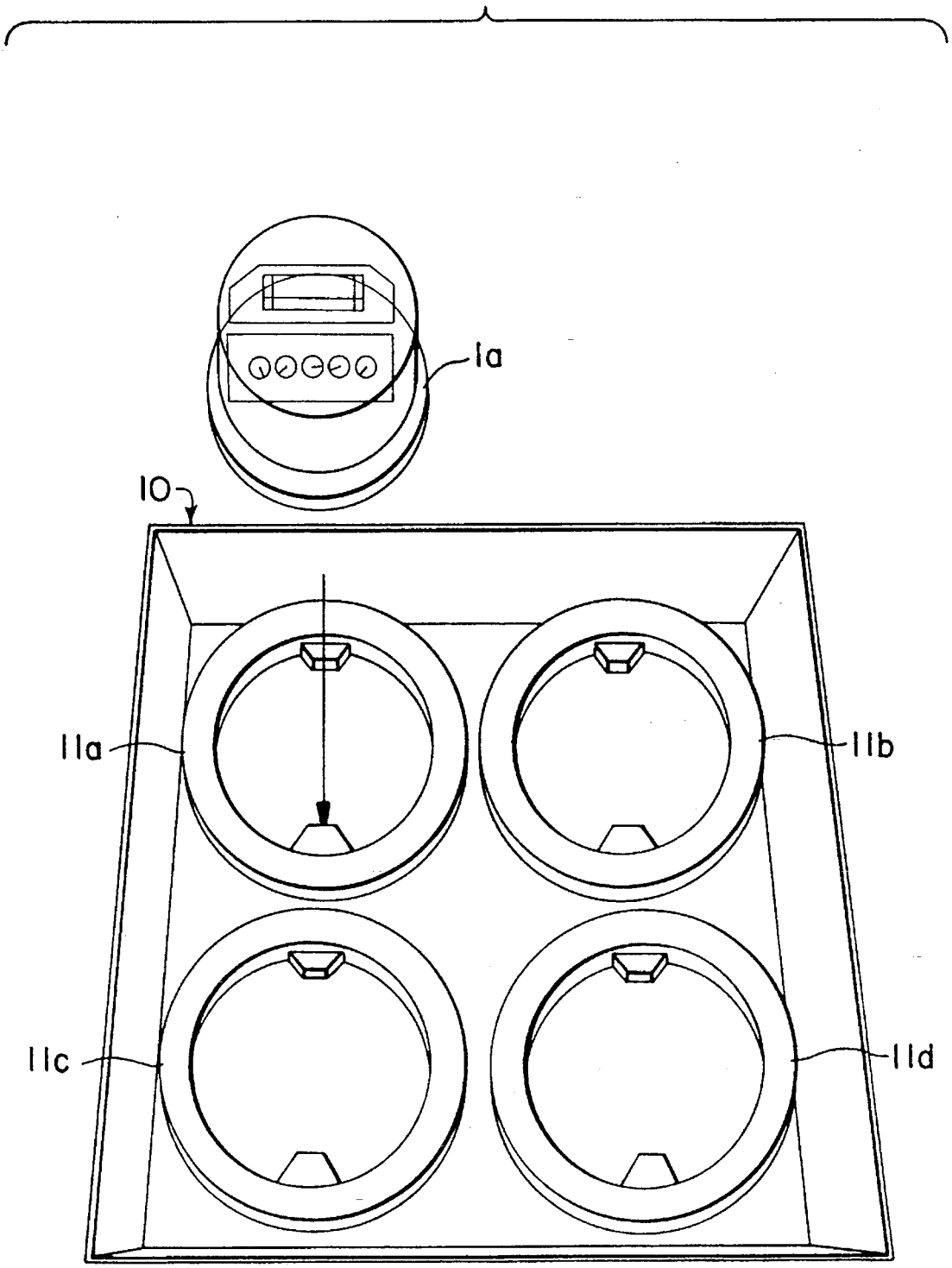
FIG. 2 depicts a socket type meter being inserted in a universal fixture receptacle, used for fixed retention of the meter and for transporting the meter to the identification and inspection station.

In following the process of the present invention, in FIG. 2 a meter 1a of the socket type is inserted into fixture receptacle 11a of transport box 10. As shown, transport box 10 is provided with fixture receptacles 11a–11d for inspection processing of groups of four meters at a time. It is understood that the number of meters in processing groups can be varied according to physical and meter number testing requirements.

Fixture receptacles 11a–d are immovably fixed into a pre-assigned position within transport box 10. Each of the receptacles corresponds in structure to the standard socket meter receptacle used to support meters at operating sites, in order to universally accept any socket type meter. Receptacles 11a–d will accept positioning of an inserted meter, such as meter 1a in one of two positions which are 180° apart from each other. As described above, the receptacles 11a–d are optionally provided with a power source which will illuminate the display of digital meters, if required.

Figure 3:
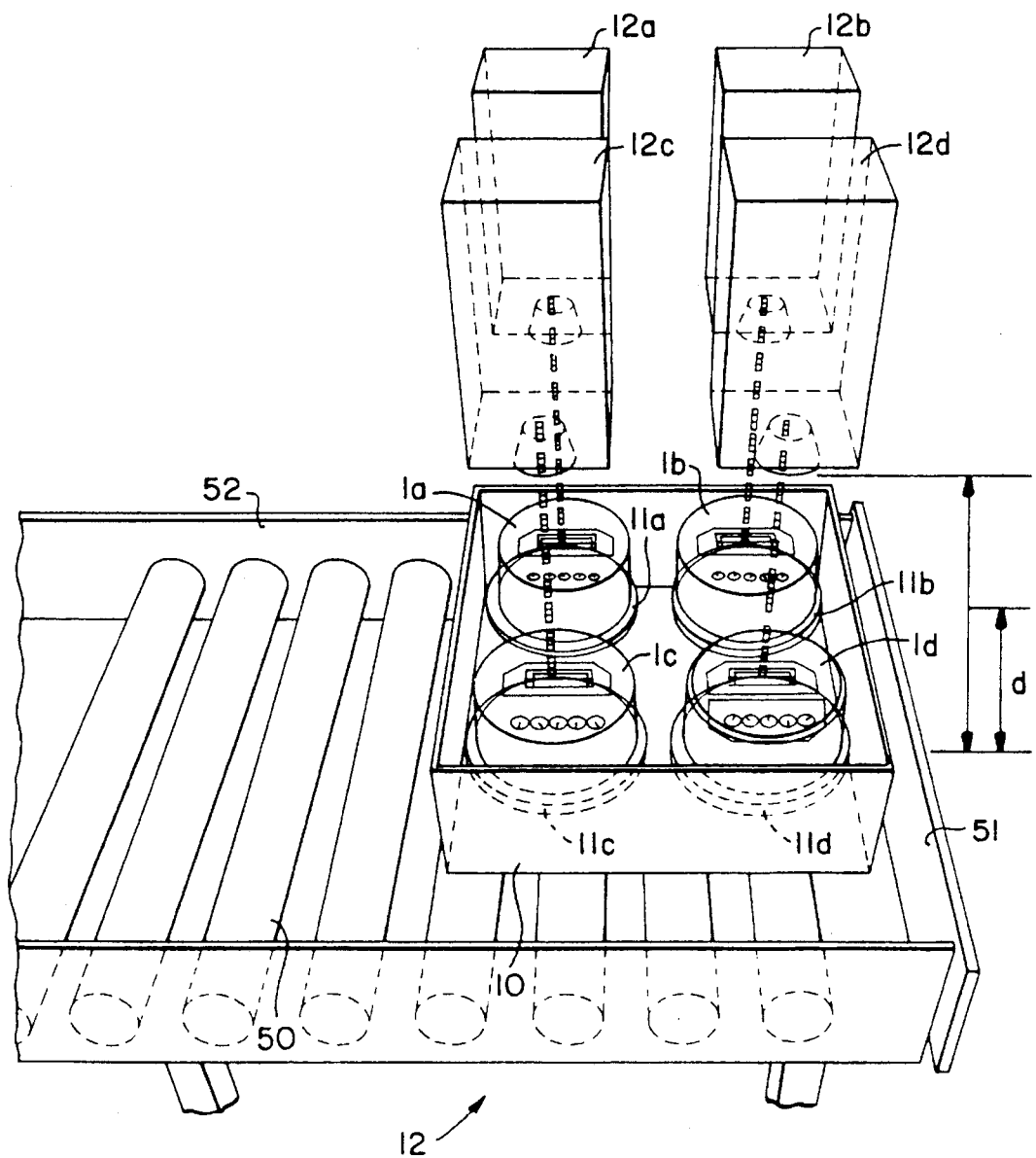
FIG. 3 depicts a group of four meters positioned into place for visual computer-linked camera scanning.

In FIG. 3, meters 1a–d, fixtured within receptacles 11a–d respectively, are transported in transport box 10 to inspection site 12 via rollers 50. Stop members 51 and 52, serve to properly vertically align meters 1a–d with video cameras 12a–d respectively. Video cameras 12a–d are linked to computers 62 for visual processing and the meter images are shown on computer monitors 60 to allow for system monitoring. The video cameras are provided with automatic irises and focussing to accommodate variations in meter height. To ensure proper focussing, the cameras are pre-focused at a distance d from the inside base of box 10, which is the measured midpoint of the heights of the various meters extant.

Figure 4A:
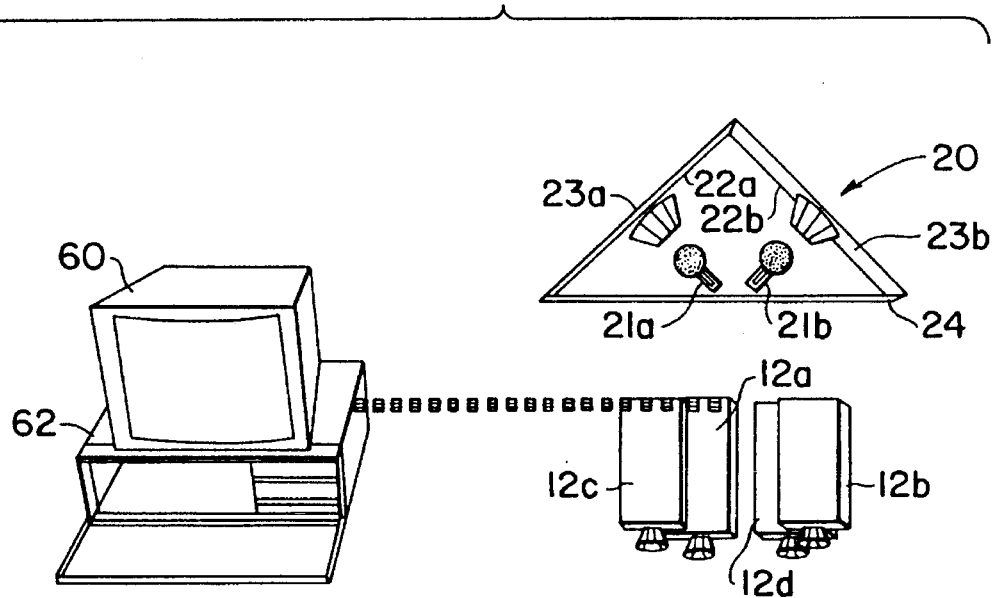
FIGS. 4a and 4b are alternative side views of light source and diffusion systems used in the illumination for visual scanning.
Figure 4B:
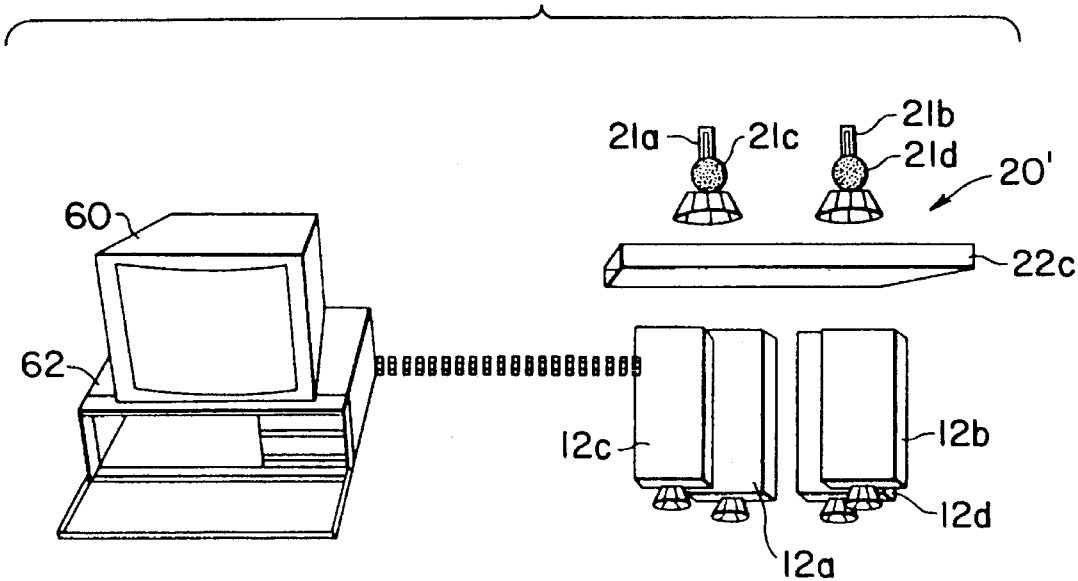

The meters are illuminated by the diffused lighting system 20 or 20' shown in FIGS. 4a and 4b respectively.

Light sources 21a and 21b, e.g., light bulbs, with reflectors 23a and 23b provide light to angled reflecting diffusion surfaces 22a and 22b respectively. The indirect diffused light then passes through light transport 24, adjacent video cameras 12a–d. The diffused indirect light and the vertical alignment of meters with respective cameras minimizes reflection and shadows to ensure truer imaging even without removal of the protective glass covers from the meters. Light sources 21a and 21b may be used directly, without reflectors 23a and 23b, as shown in FIG. 4b, provided that translucent diffusion element 22c is positioned between the light sources and the meters.

Figure 5:
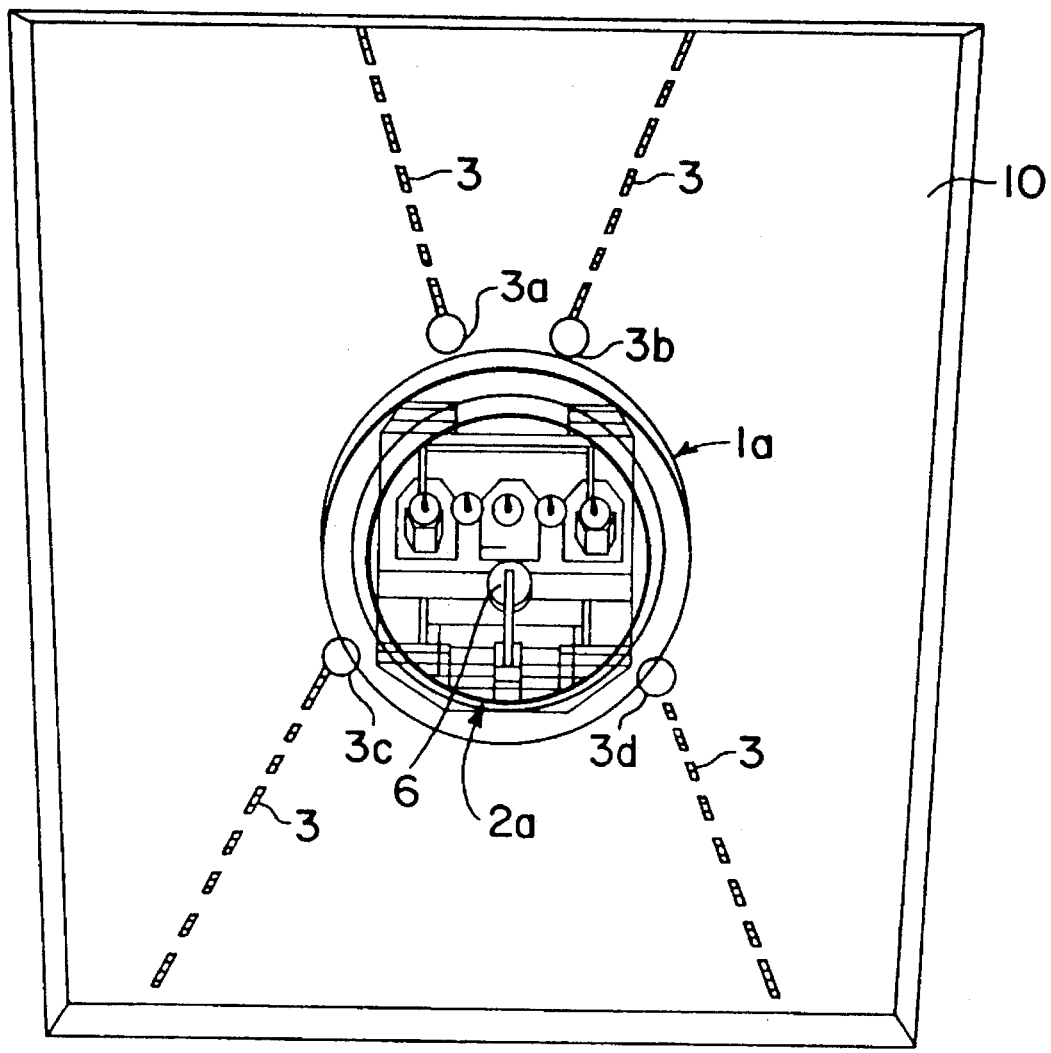
FIG. 5 depicts a typical meter face with center determination as a reference point for meter identification.

FIG. 5 depicts the initial visual scanning of meter 1a by video camera 12a. The meter 1a is approximately centered within the lens viewing area of video camera 12a and is surrounded by a light background comprising the inside base of transport box 10. The viewing image of the camera 12a is diagonally scanned along diagonals 3 from the corners of the image. Image clean-up algorithms reject dirt and other spots until dark area pixels, completely surrounded by other dark area pixels, are encountered along the diagonal. The dark area pixels 3a–d define points along the circumference of the meter face 2a. Three points of the circumference define the circular meter face and the fourth acts as a confirmation point. With the definition of the circumference of meter face 2a, center point 6 is determined as a reference point. It is noted that though most meters are of approximately the same circumferential dimensions, variations in meter height can cause deviations in scanned reference areas, therefore necessitating the circumference and reference point determinations. With such visual scanning by light-dark differentiation, integrity and uniformity of lighting, such as with the utilization of light diffusion means is very important in avoiding errors in defining the circumference.

Figure 6:
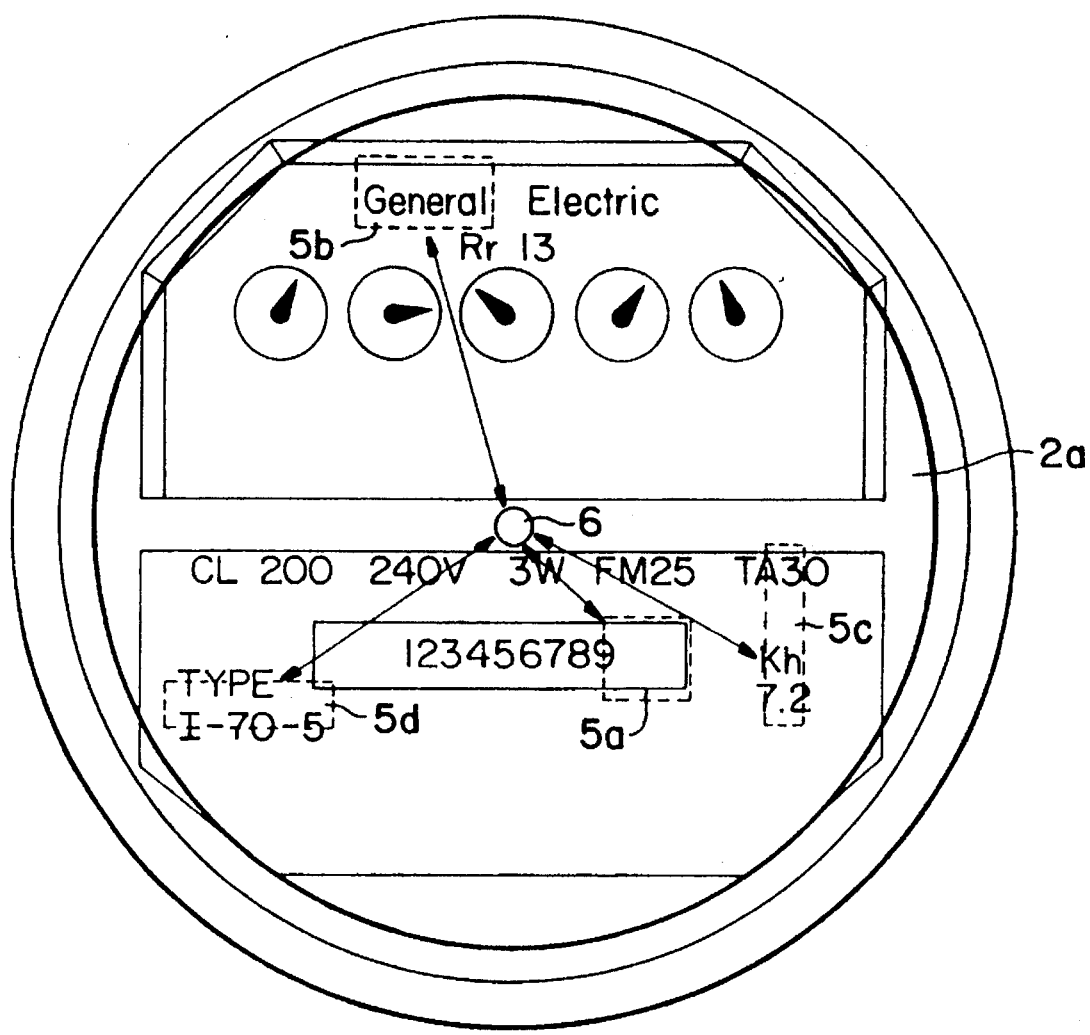
FIG. 6 is the meter face of FIG. 5 being template scanned for meter manufacturer and type identification.

As seen in FIG. 6, identification template areas 5a–d, relationally positioned relative to center reference point 6, are shown as being fitted on meter face 2a in order to effect a match (the 5b template provides the match). The matching template, during fitting is placed on diametrically opposed areas of meter face 2a to compensate for the possibility of the meter being in one of two positions. Matching of the template with the identifying area, provides identification of the particular meter (manufacturer and manufacturer type) and its orientation within the fixturing receptacle 11a.

Figure 7:
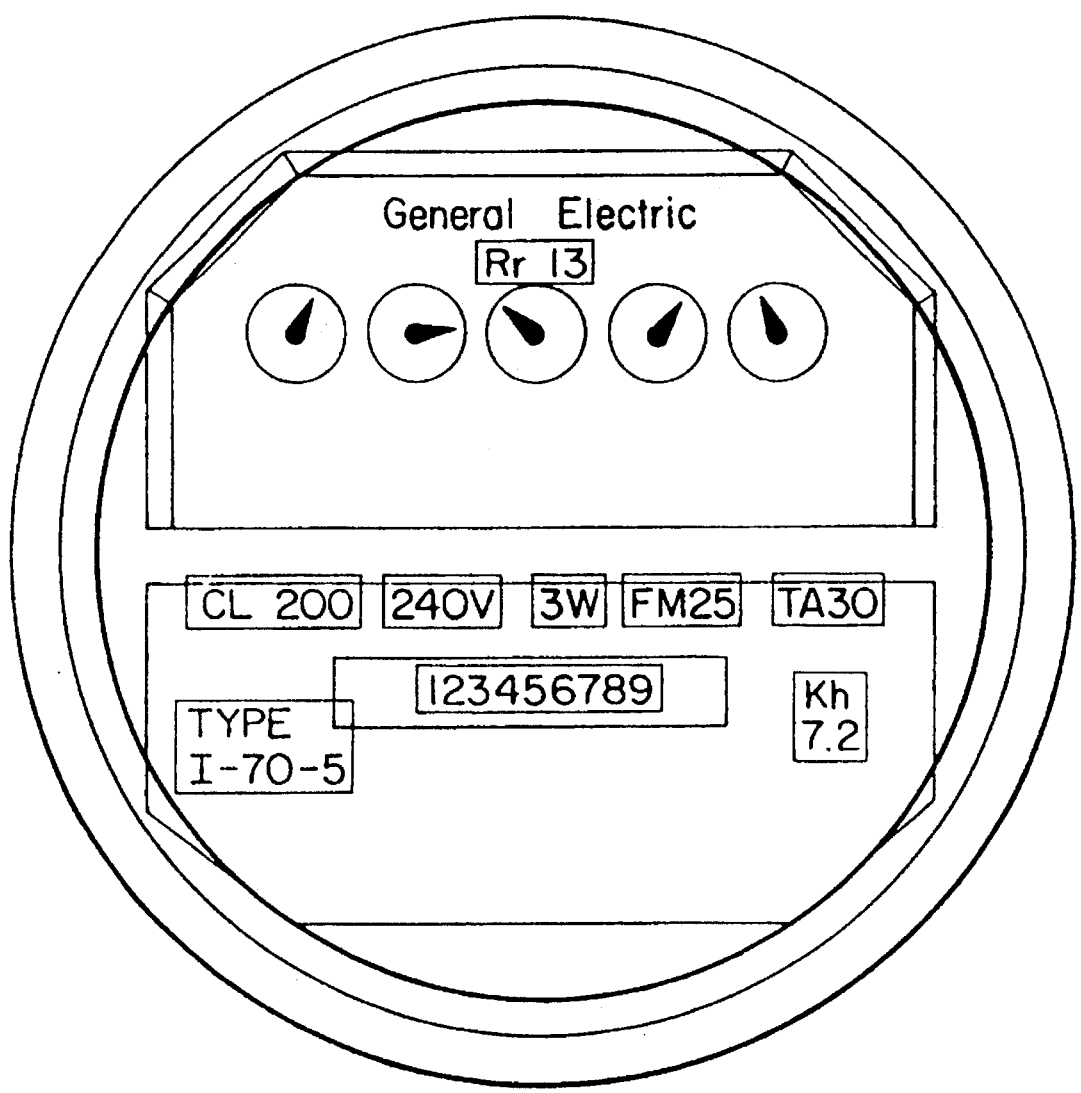
FIG. 7 depicts the meter face of FIG. 5 being visually read for meter specification identification for transmittal to a meter testing station to which the meter is subsequently transported.
Figure 10:
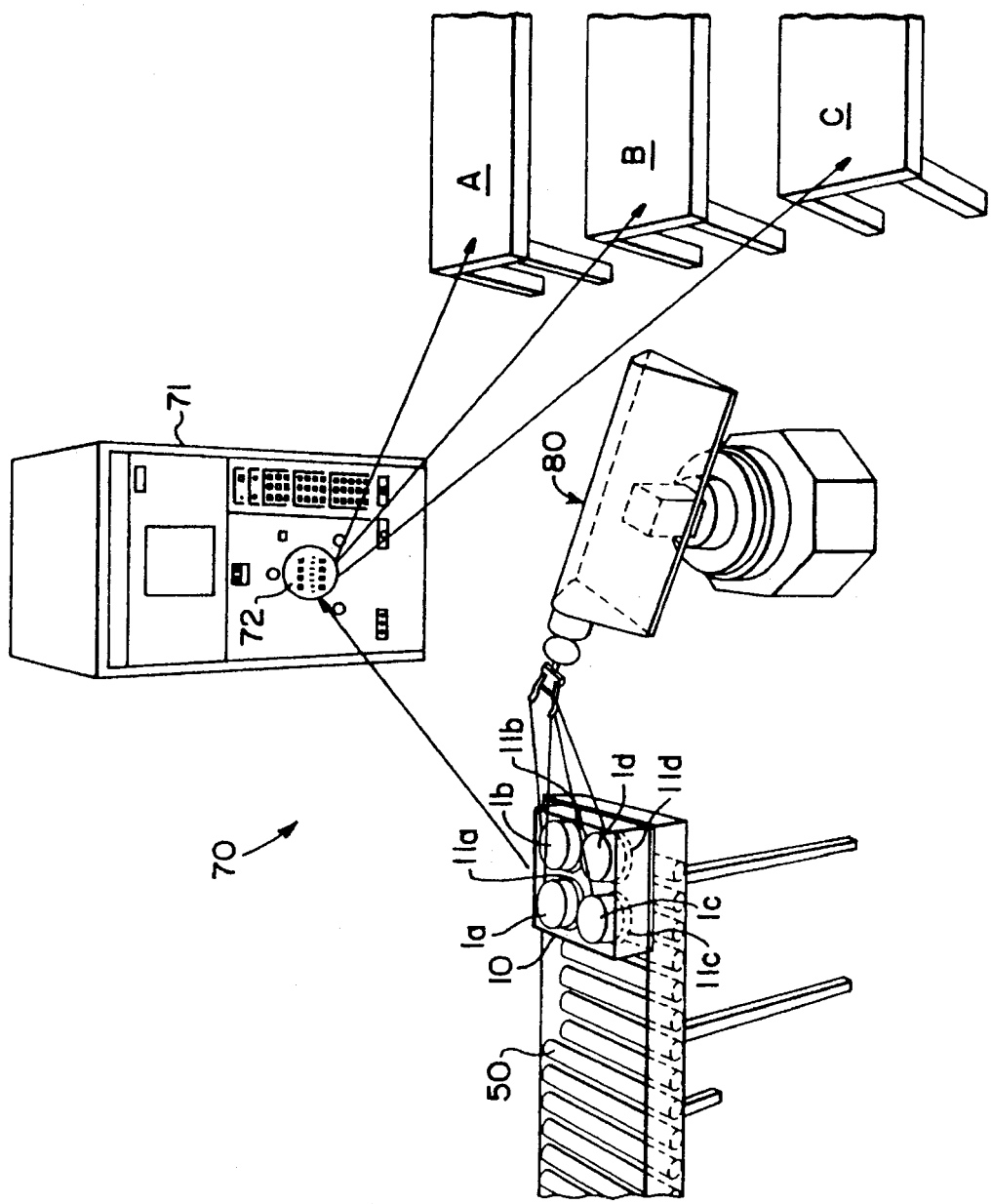
FIG. 10 schematically depicts the scanned meters being transported to the testing station and the separation of the meters onto transport lines according to scanning and testing determinations.

Identification of the meter (manufacturer and manufacturer type) enables the computer to extract correlative (relative to the determined reference point-center point 6) positions of the meter face to scan and read, with optical character recognition software commands, predetermined portions of the particular meter face. As shown in FIG. 7, the meter face is "read" for meter number, voltage, amperage, type, number of wires, etc. The "read" information is then transferred to a testing station 70 shown in FIG. 10 where the meters are physically tested for operability. The information automatically presets testing units at the testing station to the correct parameters and mode for testing the respective meters according to a computerized traffic control which directs the meters to the appropriately preset testing unit.

The "read" meter number is then transmitted to a host computer such as a electric utility meter for retrieval of specific meter history such as prior malfunction, tampering as well as meter parameters for a double check for the direct parameter "reading".

Figure 8:
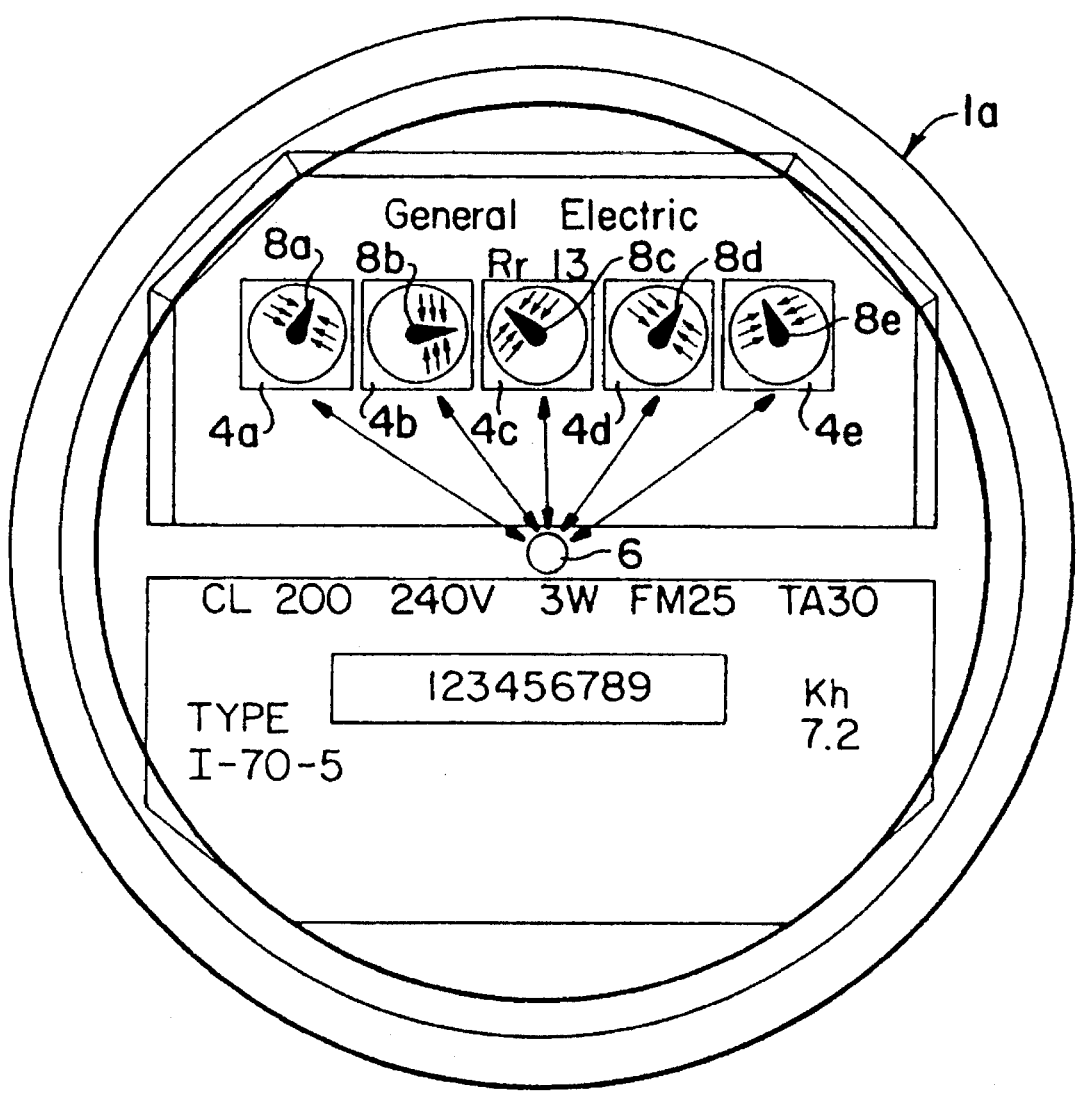
FIG. 8 depicts scanning of the dial position of the indicator needles and the indication, by relative position, of meter tampering.
Figure 8A:
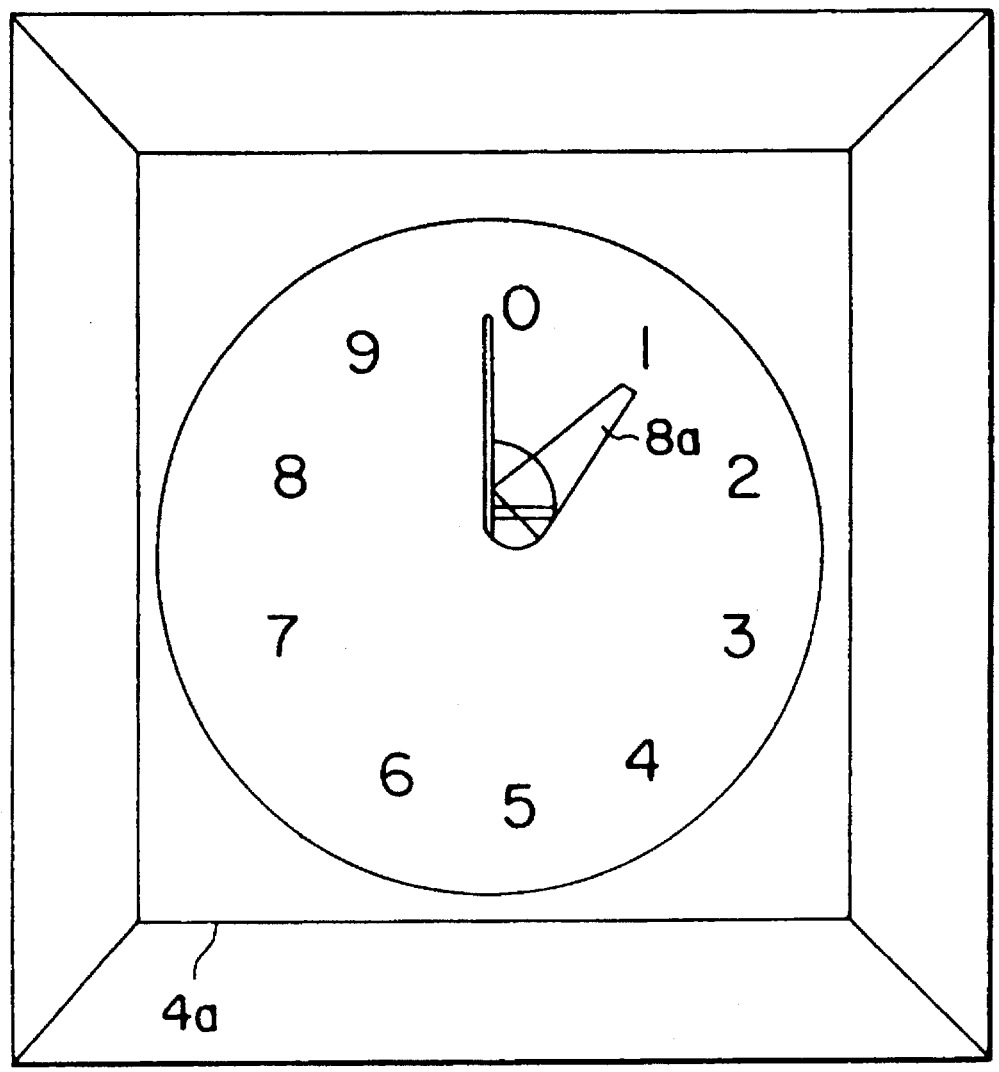
FIG. 8a is a blow-up portion of a visually scanned indicator needle with slope-position determination of the reading of the dial.

As shown in FIG. 8, the areas of the dials 4a–e of the meter 1a are visually scanned for continuous successive dark area pixels (light area pixels with reverse color images) which, when properly determined, provide an image of dial indicator needles 8a–e respectively and their angular positions. A slope determination, as schematically depicted in FIG. 8a for dial 4a, provides an exact determination of needle position, relative to the dial (as stored in computer memory for the particular meter) and thus a dial reading. The adjacent positions of needles 8a–e are then compared. Adjacent dials of any meter are interrelated by known constants and needle reading deviations therefrom serve as a positive indication of meter tampering. Though digital meters are not as susceptible to tampering, their faces, when illuminated are also read with OCR means for the purpose of determining the usage from the last meter reading to removal of the meter for testing and the appropriate billing.

Figure 9:
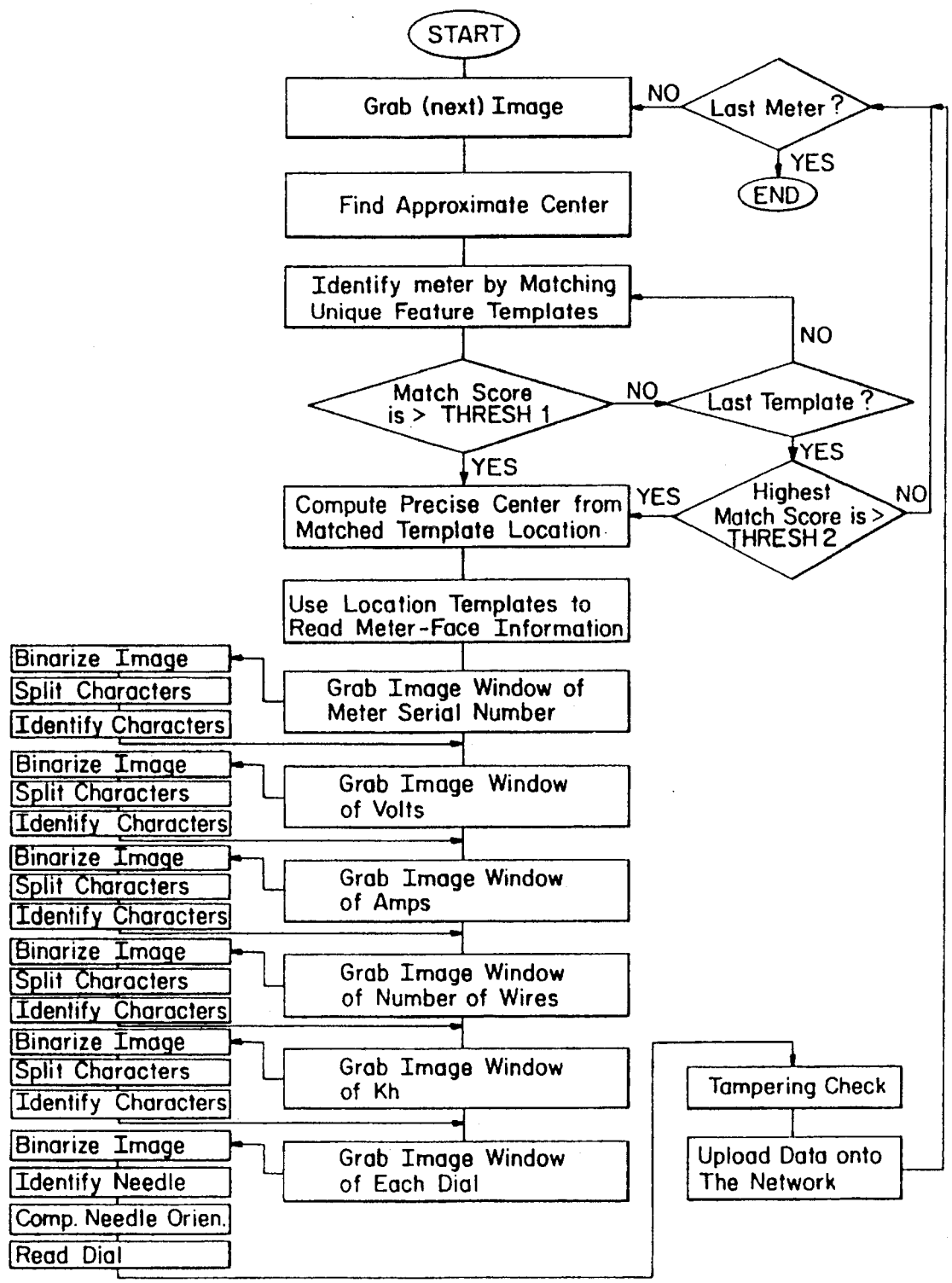
FIG. 9 is a logical flow chart for the computer determination of meter center as location reference point, with template readings of information and tampering checks.

FIG. 9 depicts the logic algorithm with which the meters are initially scanned for center location as the location reference point. With the approximate center having been determined, the meter face is matched with meter identifying templates, and a probability match score is compared to a threshold value (THRESH1) to control further proceeding. If the pre-established probability threshold value is obtained, the meter has been identified. If not, additional templates are fitted until the threshold is reached, or the last template has been fitted. If the highest score value matches a second threshold value, the meter is considered to have been identified. If not, another image is obtained to restart the identification process.

With identification of the meter, the precise center is obtained as an exact reference point for subsequent unique template identified area readings of, for example, meter serial number, volts, amps, Kh, and dial readings. The latter reading (if of dial needles) being used for a tampering check. The information is uploaded into a network of the utility mainframe computer and to pre-load the information into a testing station.

After the meters 1a–d are respectively visually scanned for meter parameters, reading and possible tampering, they are transported via rollers 50 to meter testing station 70 having meter testers 71 (preferably corresponding in number to the number of meters in an informational processed batch, e.g., four, in the illustrated embodiment). The meters 1a–d are physically removed from receptacle fixtures 11a–d respectively with a robot arm 80, with correct orientation instructions received during the visual template inspection, and properly placed into the appropriate testing sockets 72 of individual pre-configured meter testers 71. After the physical testing, the individual meters are removed from the respective testing sockets 72 by the robot arm 80 and placed on one of meter lines A, B or C, corresponding to meters which have been found to be defective for disposal, meters which have been found to have been tampered with for investigation, and meters which are operable for return to use with or without refurbishment, respectively.

In FIGS. 11 and 12, a portable device 110 is shown, powered by power pack 170, which comprises an internally contained diffused lighting source 120, and ambient light shielding hood 130, adapted to be handled by pistol grip 115 and positioned over the face of the meter 100. To accommodate meters of varying diameters, the hood 130 is optionally expandable to snugly enclose the meter and to exclude extraneous light impingement.

The device 110 comprises video camera member 140 which either records a properly illuminated video image of meter 100 for subsequent reading and analysis, or directly transmits the image to a remote computer (not shown) by modem, and the like, or to self contained CPU 150. In the latter instance, of direct transmission to an internal computer (CPU 150), perimeter or circumference determination is effected either as described above by computer generated algorithm contained in CPU 150 or by mechanical determination of the diameter of hood 130. Template identification is, as described above, with preprogrammed instructional algorithms in CPU 150, and the digital meter reading 102 is read for billing purposes and analyzed and stored by CPU 150'. PCMCIA cards at 152 provide hard copy storage of data files or entry of additional templates or other requisite data. General instructions and control are entered via keypad 180.

Figure 13A:
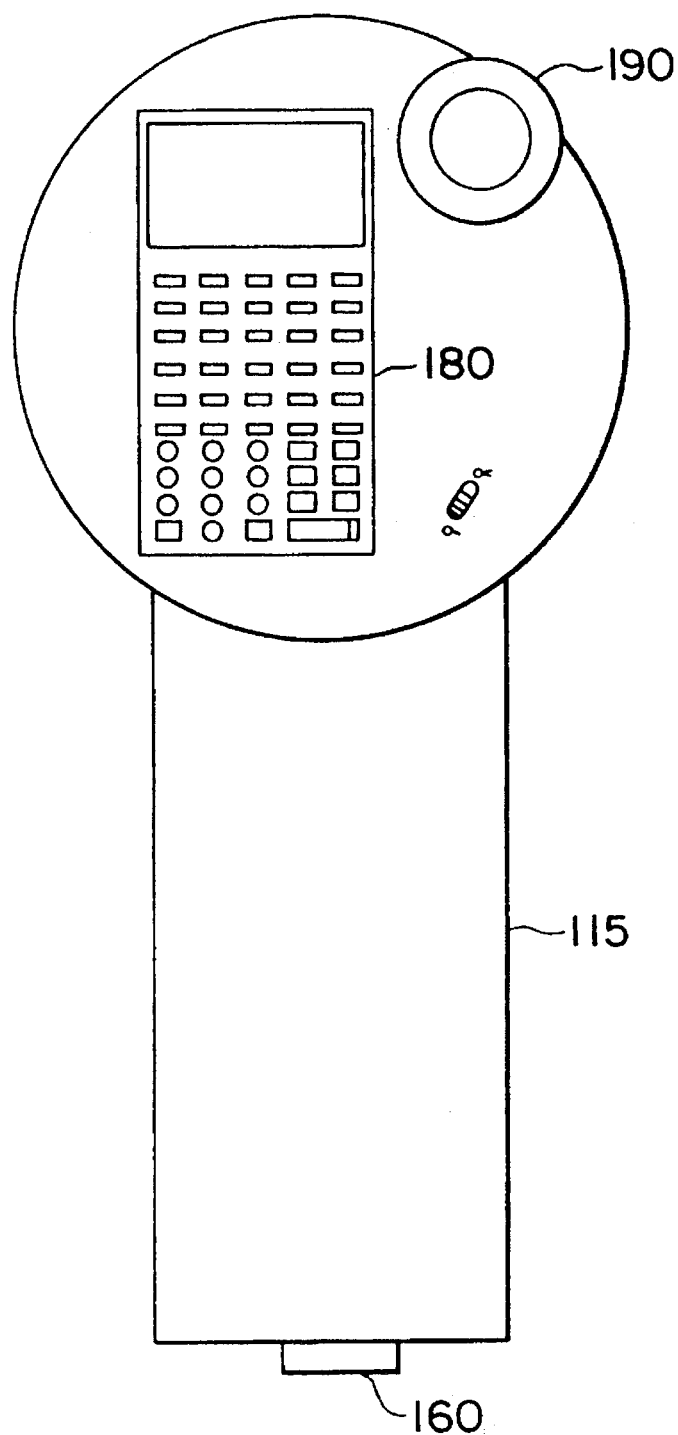
FIGS. 13a and 13b are alternative rear views of embodiments of the device in FIG. 11.
Figure 13B:
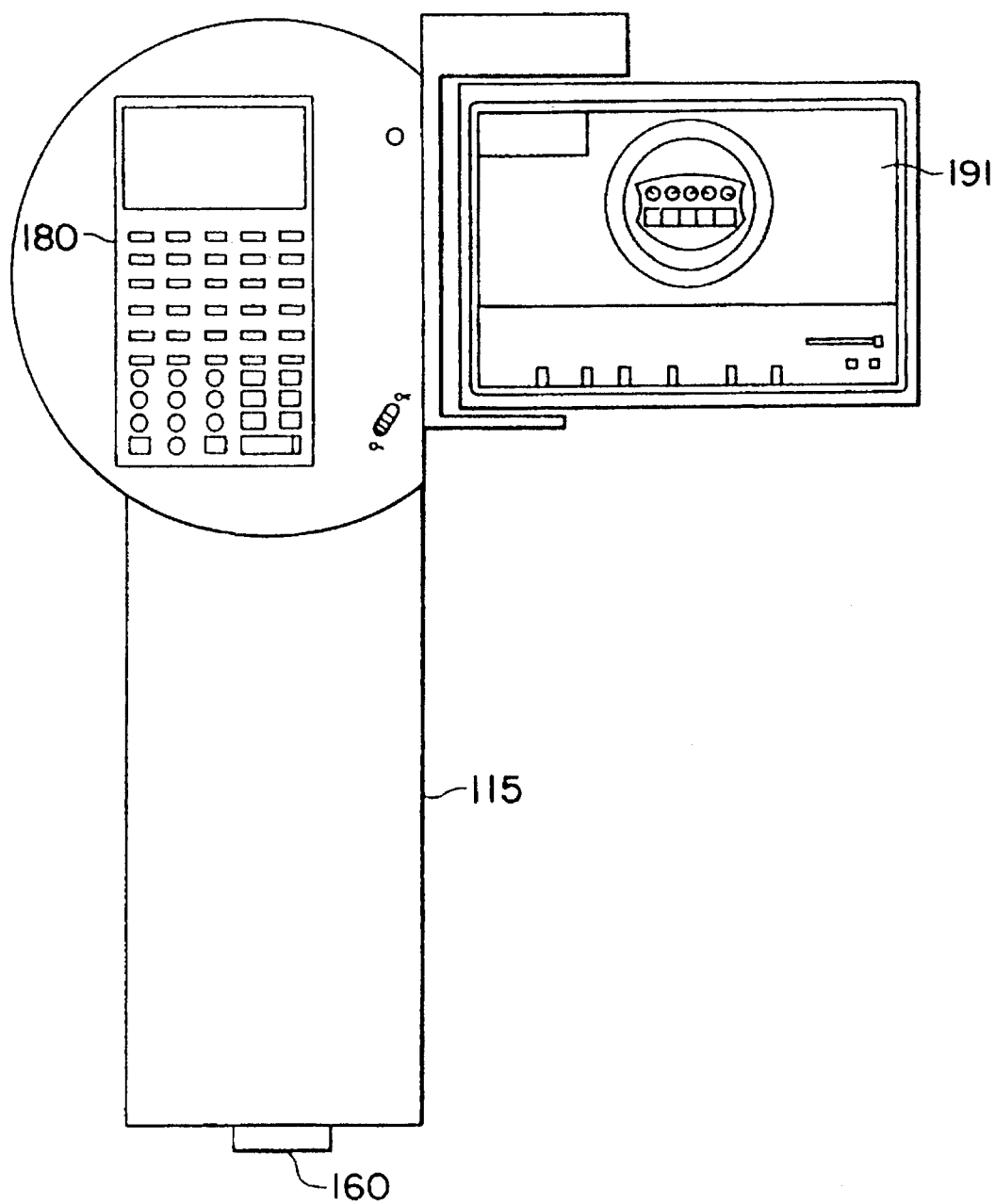
Figure 13C:
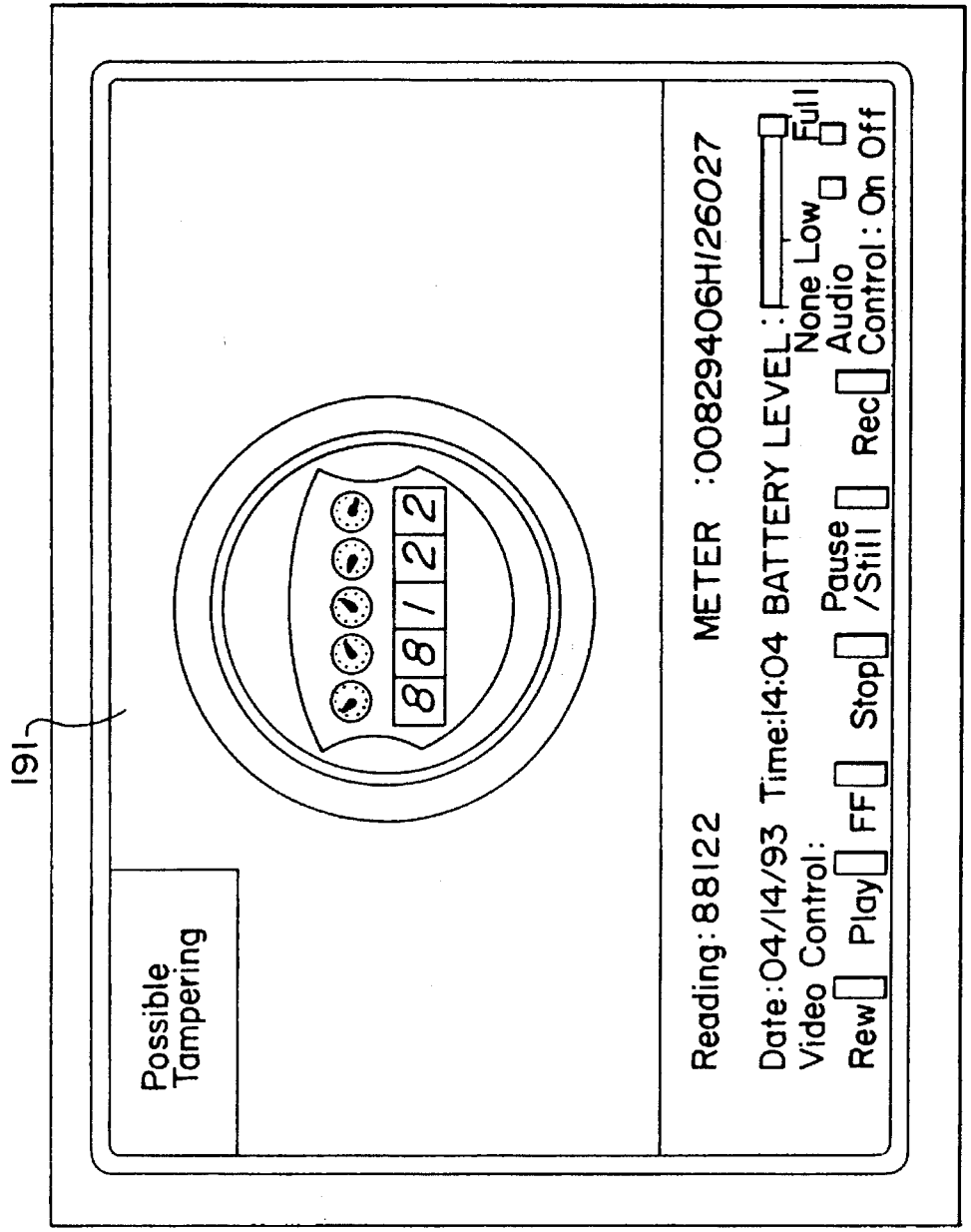
FIG. 13c is a blow-up of the viewing screen shown in FIG. 13b.
Figure 14:
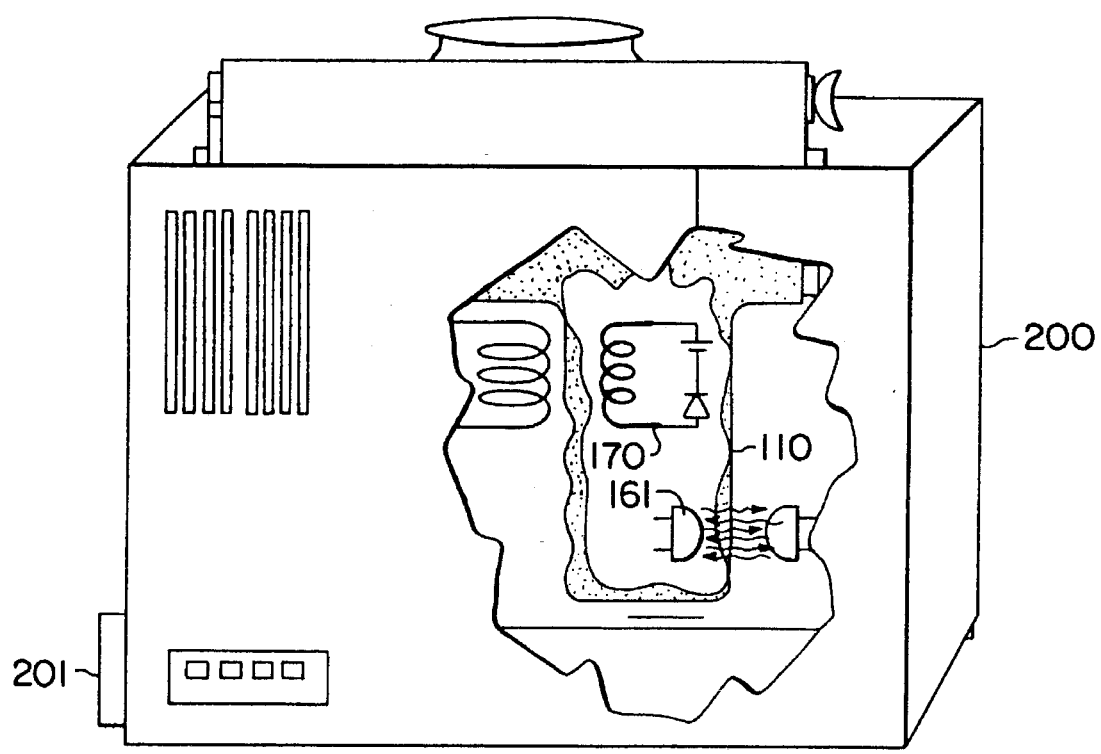
FIG. 14 depicts the downloading of meter reading data taken by the portable device shown in FIG. 11, to a remote central storage and processing unit.

View finder 190 provides a direct view of the meter through the portable device as shown in FIG. 13a. Alternatively, in place of the view finder, as shown in FIGS. 13b and 13c, a video screen LCD image 191 of the meter face, with computer generated informational data, is made visible. This data includes the possibility of tampering (based upon preprogrammed relations between the needle dial positions or a reading showing the breaking of a bar code seal, indicating that the meter was removed from its socket), date stamping, verification of meter number and functional condition of the device. If the meter comprises dials (as determined by the template identification), the needles are read, as described above, by the light-dark needle position determination algorithm, coupled with the slope determination both of which are contained in CPU 150. At the same time, relation between the needles is computer analyzed for determination, on site, if the meter has been subject to tampering.

As shown in FIG. 13b, the video screen also shows a translation of the needle dial reading to a digital read out. In the embodiments of the portable device shown in FIGS. 12–13c, the device is shown with a down-loading RS 232 communication port 160 or via an infrared transmission element 161.

Docking port 200, stationed in a vehicle or an office, accommodates the insertion of the portable device 110 and effects the transmission of meter reading and/or tampering data to the remote central location via communication connector 201. Such transmission to a central processing point can be by cellular phone transmission, radio wave transmission and the like. If made sufficiently portable, the docking port functions may be integrated directly in the portable device itself.

It is understood that the above description and drawings are only illustrative of the present invention and that changes in structure, number of components, correlation therebetween, transport, scanning operations and the like are possible without departing from the scope of the present invention as defined in the following claims.

What is claimed is:

1. A method for automated obtaining of information from devices having exposed faces, with fixed and changeable visual indicia of information thereon; and wherein each of said devices, is fixedly positioned in a pre-set position; said method comprising the steps of:
   a. illuminating an exposed face with non shadow casting diffused light;
   b. finding a location reference point on the face of the device by visually scanning the illuminated exposed face and the area peripheral thereto, by visual scanning means, with computer feedback means, whereby the periphery of the illuminated exposed face is determined; and determining the location reference point on the illuminated face relative to said periphery, with said computer feedback means;
   c. identifying the face of the device and the device by fitting areas of the face of the device, relative to the location reference point, with computer feedback means utilizing computer-stored visual template means, comprising individual templates unique to each of the devices, until a template correlates with a prelocated position on the face of the device being template fitted; with the particular face and device being thereby identified;
   d. visually scanning the illuminated identified face for the visual indicia thereon, by optical character recognition means, with location instructions by the computer feedback means, with reference to computer stored parameters of the device and the face thereof; and
   e. wherein the said illuminated exposed face is circular and has a circumference, wherein the said area peripheral to the illuminated face is a light pixel area, and the said periphery of the illuminated face is a dark pixel area; wherein the circumference of the illuminated exposed face is determined by visually scanning the area peripheral to the illuminated exposed face, for light and dark pixel areas, in diagonal directions, which intersect said face at least at three points, wherein for each intersection, light pixel areas change to dark pixel areas; said three points defining the circumference of the face.

2. The automated method of claim 1, wherein said devices are electric meters.

3. The automated method of claim 2, wherein the illuminated identified face comprises a plurality of needle dial indicators and wherein the needle dial indicators are visually scanned, by the visual scanning means, for needle positions, with location instructions from the computer feedback means, with reference to the computer stored identified face parameters.

4. The automated method of claim 3, wherein dial areas of the meter, as determined by reference to the computer stored identified face parameters are visually scanned for successive changes from light to dark pixels which represent the shape and direction of respective needle indicators of the respective dials.

5. The automated method of claim 4, wherein said computer feedback means effects a slope determination of the respective needle indicator positions and correlates said slope determination to provide a dial and meter reading.

6. The automated method of claim 5, wherein the relative position of the needle indicators is compared, by said computer feedback means, to predetermined relative positions of the needle indicators, with deviation of the relative position from the predetermined relative positions providing an indication of meter tampering.

7. The automated method of claim 1, wherein said devices are meters and said changeable visual indicia of information comprises a reading of the meter.

8. The automated method of claim 1, wherein said meters are electric usage meters, said meters having a substantially round face, wherein said periphery of the exposed meter face is a circumference thereof.

9. The automated method of claim 8, wherein said location reference point comprises the center of the exposed meter face.

10. The automated method of claim 8, wherein said meters are fixedly positioned in said pre-set positions by retaining means.

11. The automated method of claim 10, wherein said retaining means comprises the socket into which the meter is placed for metering use thereof.

12. The automated method of claim 10, wherein said retaining means comprises a fixture element which fixtures the meter in non-movable relation to the visual scanning means during said visual scanning.

13. The automated method of claim 12, wherein said fixture element holds the meter during transport of the meter to the visual scanning means.

14. The automated method of claim 7, wherein said changeable visual indicia of information are electrically activated; wherein said meters are fixedly positioned in said pre-set positions by retaining means which fixtures the meter in non-movable relation to the visual scanning means during said visual scanning; and wherein said retaining means further comprises electrical activation means for activating the changeable visual indicia during said visual scanning.

15. The automated method of claim 2, wherein the meter face is illuminated by a light source wherein a diffusion element is interposed in the light path between the light source and the face of the meter.

16. The automated method of claim 15, wherein the meter face is illuminated by a light source wherein a translucent diffusion element is interposed in the light path between the light source and the face of the meter.

17. The automated method of claim 15, wherein the meter face is illuminated by a light source wherein light from the light source is reflected and diffused by a diffusion element onto the face of the meter.

\* \* \* \* \*